Aug. 22, 1961 J. J. EACHUS 2,997,602
ELECTRONIC BINARY COUNTER CIRCUITRY
Filed March 28, 1958
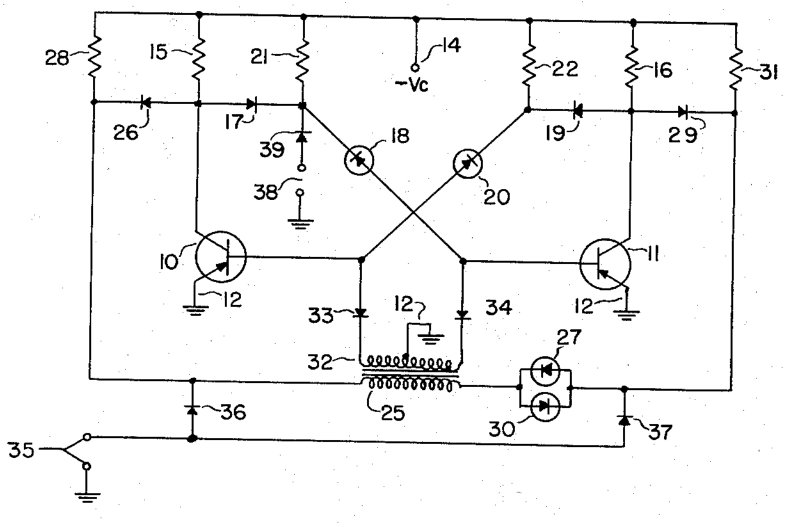
INVENTOR.
JOSEPH J. EACHUS
BY Henry L. Hanson
ATTORNEY 2,997,602
Patented Aug. 22, 1961

2,997,602

ELECTRONIC BINARY COUNTER CIRCUITRY

Joseph J. Eachus, Cambridge, Mass., assignor to Minneapolis-Honeywell Regulator Company, Minneapolis, Minn., a corporation of Delaware Filed Mar. 28, 1958, Ser. No. 724,689
7 Claims. (Cl. 307—88.5)

A general object of the present invention is to provide a new and improved binary counter circuit useful in the handling of digital information. More specifically, the present invention is concerned with an electrical binary counter circuit utilizing an apparatus capable of being switched between one of two bistable states in accordance with an applied input signal wherein the apparatus is characterized by its ability to accept binary signals with a wide tolerance in the timing of the applied input signal.

In a co-pending application of the present inventor bearing Serial Number 656,791, filed May 3, 1957, there is disclosed a bistable flip-flop circuit using transistor devices as the active elements of the circuit. The present circuit was designed for use with the foregoing type circuit as well as similar flip-flop circuits to extend the usefulness of such circuits so that they may be used as a binary counter stage and so that they may further provide circuits which are capable of operating with input switching pulses having wide timing variations in the switching pulses.

The objects and advantages of the present invention are achieved by a new and novel arrangement of a coupling circuit for a bistable flip-flop circuit which is arranged to provide appropriate switching pulses required for switching the bistable states of the circuit. The coupling arrangement as used herein comprises a transformer having a primary winding which is connected in the current flow circuit of the switching devices of the bistable circuit. The direction of the current flow through the primary winding will be a function of which one of the two switching devices is in the conducting state. A secondary winding on the transformer is arranged to be coupled to the inputs of the switching devices and is effective, upon a change of current being effected at the primary of the transformer, to cause a switching of the circuit from one bistable state to the other.

It is accordingly a further more specific object of the present invention to provide a new and improved binary counter stage or binary flip-flop which incorporates a transformer having a primary winding connected in the current flow circuit of the switching devices of the flip-flop and a secondary winding coupled to the switching devices to control the operation thereof and effect the desired switching of the circuit upon a change in the current flow condition in the transformer.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Referring to the single figure, the numeral 10 represents an electrical switching device here illustrated as a transistor having the usual base, emitter, and collector electrodes. Operating with the transistor 10 is a further transistor 11, the latter also having the normal base, emitter, and collector electrodes. Power is supplied to the transistors 10 and 11 by a suitable power source connected to the power supply terminals including the grounded terminal 12 and a $-V_C$ terminal 14. Connecting the transistors 10 and 11 in series with the power supply terminals 12 and 14 are suitable load resistors 15 and 16.

Coupling the collector of the transistor 10 to the base of the transistor 11 is a germanium diode 17 and a silicon diode 18. Connecting the collector of the transistor 11 to the base of the transistor 10 is a further germanium diode 19 and a silicon diode 20. Connecting the junction between the diodes 17 and 18 to the power supply terminal 14 is a resistor 21 while a resistor 22 connects the junction point between the diode 19 and 20 to the terminal 14. The collector of the transistor 10 is coupled to one end of a transformer primary winding 25 by way of a coupling diode 26. A further resistor 28 is coupled to the diode 26 and to the $-V_C$ terminal 14. A diode 29 couples the collector of the transistor 11 to the other end of the primary winding 25. Included in this last named connection are a pair of silicon diodes 27 and 30. A resistor 31 couples the diode 29 to the $-V_C$ terminal 14. The secondary winding 32 co-operates with the primary winding 25 and is arranged to have a grounded center tap. The ends of the secondary winding are coupled to the bases of the transistors 10 and 11 by way of a pair of coupling diodes 33 and 34, respectively.

The input to the circuit is by way of a pair of input terminals 35 and a pair of coupling diodes 36 and 37, the latter being connected to the primary 25. In the absence of an input signal, the ungrounded terminal 35 is effectively floating by way of a connection to a high impedance device, not shown. A further input is provided at terminals 38 and includes a diode 39.

In considering the operation of the over-all circuit, it is first assumed that the circuit is in one or the other of its two bistable states. The bistable state first considered is that state wherein the transistor 10 is conducting heavily in the emitter-collector circuit. The circuit may be switched to that state by applying a grounding signal to the input terminals 38. This signal has the effect of grounding the lower terminal of resistor 21 to drop the potential on diode 18 below its conducting threshold. This will cause the transistor 11 to be cut off and thus the lower terminal of the resistor 16 will become negative. The negative potential will also appear at the lower terminal of resistor 22 to make the diode 20 conduct. This will then cause the current to flow through the diode 20 from the base of transistor 10 to switch this transistor into conduction.

Under these circumstances, the emitter-collector current flow will be passing through four separate paths. The first and most direct path is that from the ground terminal 12 through the transistor 10, resistor 15 to the terminal 14. The second path will be from the ground terminal 12 through the transistor 10, diode 17, and resistor 21 to the terminal 14. The current flow through the last traced circuit is effective to place a potential which is substantially at ground at the lower end of the resistor 21. The effect of this is to place a voltage on the silicon diode 18 which is less than that necessary for the diode to conduct. In other words, the voltage on the diode 18 is less than its conducting threshold and the diode will remain as a high impedance in the base circuit of the transistor 11. A further circuit may be traced for the emitter-collector current flow and this path is from the ground terminal 12 through the transistor 10, diode 26, primary 25, diode 30 and resistor 31 to the negative supply terminal 14. The fourth circuit may be traced from the transistor 10 through the diode 26, and resistor 28 to the negative power supply terminal 14.

While the transistor 10 is conducting in the emitter-collector path, the transistor 11 will be cut off. When the transistor 11 is cut off, the voltage on the collector, and consequently the voltage on the lower terminal of the resistor 16, will be substantially that of the negative supply terminal 14. Further, the voltage on the lower terminal of the resistor 22 will also be at the voltage of the negative power supply terminal 14. This will mean that the conducting threshold of the diode 20 will have been exceeded and a base current will flow from the transistor 10 through the diode 20 and resistor 22 to the minus power supply terminal 14.

The circuit will remain in its aforementioned stable state until such time as an input signal is applied to the input terminals 35. Insofar as switching the circuit from one bistable state to the other, this may be accomplished by applying an effective shorting signal to the input terminals 35. The presence of this shorting or grounding signal will have the effect of applying a ground to the circuit which includes the primary winding 25. The presence of the grounding signal, when the transistor 10 is conducting, will be effective through the diode 37 to ground the right hand terminal of the diode 30. This will drop the potential on the diode 30 below its conducting threshold and the current flow through the primary 25 will stop. The resultant change in the current flow in the primary winding 25 will be effective to produce a signal in the secondary winding 32. This signal will in turn be coupled to the base electrodes of the transistors 10 and 11. The polarity of this signal will be such as to switch the transistor 11 into the conducting state and the transistor 10 into the nonconducting state. In other words, the transformer secondary 32 will have a negative signal on the right hand terminal and this will be coupled to the base of the transistor 11. A positive signal will be coupled to the base of the transistor 10 from the left hand terminal of the secondary 32. It will be noted that when the grounding signal on the input terminals 35 is removed that the resultant inductive kick from the primary winding 25 in the secondary 32 will be in a direction to reinforce the signal which caused a switching of the circuit from the first bistable state to the second. Consequently, the action of the circuit will be independent of the time length that a shorting signal is applied to the input terminals 35.

Once the circuit has been switched to the second bistable state where the transistor 11 is conducting, the current flow circuits will be opposite to that traced above. In this regard, it should be noted that the current flow through the emitter-collector circuit of the transistor 11 will now be passing through the diode 29, diode 27, primary 25, and resistor 28 to the negative power supply terminal 14. Similarly, the current flow in the circuit will now be such that the diode 18 will have a current flowing therein from the base of the transistor 11 tending to hold the circuit in the second bistable state.

The circuit will remain in the second bistable state until such time as a further grounding signal is applied to the input terminals 35. The effect of this grounding signal will be as before; i.e. a stopping of the current flow through the primary winding 25 and a resultant signal pulse on the secondary 32 which will be effective to switch the transistor 11 to a nonconducting state and the transistor 10 into the conducting state. Again, as the grounding signal is removed from the terminals 35, there will be a change in the current flow through the winding 25. However, the resultant voltage swing in the secondary 32 will be of the desired polarity to maintain the circuit in the condition to which it was switched by the application of the grounding signal.

The transformer in the circuit is useful not only in switching the bistable state of the circuit from input signals on terminals 35 but also in the normal switching as by way of the terminals 38. This is due to the positive or regenerative feedback action produced by the transformer which accelerates the turnover from one stable state to the other. In other words the regenerative feedback from the transformer is effective in switching the circuit whether the input is by way of the terminals 35 or 38.

The particular advantage in using the silicon diodes 27 and 30 in the circuit is that they enhance the current changes effected in the primary 25 when a grounding signal is applied to the input 35. The circuit may be made to operate satisfactory by inserting a resistor in place of the two diodes 27 and 30. However, the switching characteristics are not as good as with the diodes.

It will be readily apparent that the foregoing switching circuit used in the present invention may be applied to numerous types of bistable circuits wherein it is desired to achieve a binary type of operation as is needed in a binary counter stage. It will further be apparent that these circuits may be suitably cascaded and gated together to provide a multiple bit counting circuit in a manner well known in the art.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A binary counter stage comprising a bistable flip-flop having two switching devices adapted to be alternately switched from a conducting state to a nonconducting state, a single transformer having a single primary winding and a secondary winding, means connecting said primary winding in the conducting circuit of both of said switching devices, means including a first pair of diodes connecting said secondary winding in controlling relation to said switching devices, and input control means including a second pair of diodes connected to said primary winding to change the current flow therein to effect a switching of said counter stage.

2. A binary counter stage comprising a pair of transistor switching devices, each having an input and an output circuit, means cross connecting the inputs and outputs of said stages to form a bistable flip-flop, and a switching circuit for said flip-flop, said switching circuit comprising a single transformer having a single primary winding and a secondary winding, first diode means connecting said primary winding in circuit with the outputs of both of said switching devices, second diode means connecting said secondary winding to the inputs of both of said switching devices, and input control means coupled to said transformer to change the current flow therein and switch the bistable state of said flip-flop.

3. A binary counter stage comprising a pair of transistor switching devices, each having an input and an output circuit, means cross connecting the inputs and outputs of said stages to form a bistable flip-flop, and a switching circuit for said flip-flop, said switching circuit comprising a single transformer having a primary winding and a secondary winding, means including a first pair of oppositely poled diodes connecting said primary winding in a conducting circuit with the outputs of both of said switching devices, means including a second pair of diodes connecting said secondary winding to the inputs of both of said switching devices, and input control means coupled to the primary winding of said transformer to change the current flow therein and switch the bistable state of said flip-flop.

4. A binary flip-flop circuit comprising a pair of bistably connected transistors, each of said transistors having an emitter, base, and collector, a pair of power supply terminals, means connecting said transistors in the emitter-collector path to said power supply terminals, a single transformer having a single primary winding and a secondary winding, first asymmetrically conducting means connecting said primary winding in a current flow circuit with the emitter-collector paths of both of said transistors, second asymmetrically conducting means connecting said secondary winding to the base-emitter circuits of both of said transistors, and input means coupled to said primary winding to change the current flow therein and thereby switch the bistable state of said flip-flop circuit.

5. A binary flip-flop circuit comprising a pair of bistably connected transistors, each of said transistors having an emitter, base, and collector, a pair of power supply terminals, means connecting said transistors in the emitter-collector path to said power supply terminals, a single transformer having a primary winding and a secondary winding, means including first asymmetrically conducting means connecting said primary winding in a current flow circuit with the emitter-collector paths of both of said transistors, means including second asymmetrically conducting means connecting said secondary winding to the base-emitter circuits of both of said transistors, and input means coupled to said primary winding to change the current flow therein and thereby switch the bistable state of said flip-flop circuit, said input means comprising means to shunt current away from said primary winding to produce a switching signal in said secondary winding.

6. A binary counter stage comprising a bistable flip-flop having two switching devices adapted to be alternately switched from a conducting state to a nonconducting state, a single transformer having a primary winding and a secondary winding, means connecting said primary winding in the conducting circuit of both of said switching devices, a pair of oppositely poled parallel connected diodes connected in series with said primary winding, means connecting said secondary winding in controlling relation to both of said switchig devices, and input control means connected to said primary winding to change the current flow therein to effect a switching of said counter stage.

7. A binary counter stage comprising a bistable flip-flop having two switching devices adapted to be alternately switched from a conducting state to a nonconducting state, a single transformer having a primary winding and a secondary winding, means connecting said primary winding in the conducting circuit of both of said switching devices, a pair of parallel and oppositely connected diodes connected in series with said primary winding, said diodes having an appreciable threshold of conduction, means connecting said secondary winding in controlling relation to said switching devices, and input control means connected to said primary winding to change the current flow therein to effect a switching of said counter stage, said last named means comprising a further pair of diodes having a conducting threshhold less than that of said first named pair of diodes.

References Cited in the file of this patent

UNITED STATES PATENTS

| | | |
|---|---|---|
| 2,485,395 | Lord | Oct. 18, 1949 |
| 2,759,104 | Skellett | Aug. 14, 1956 |
| 2,782,309 | Aasma | Feb. 19, 1957 |
| 2,787,712 | Priebe | Apr. 2, 1957 |
| 2,819,394 | Gordon | Jan. 7, 1958 |
| 2,885,549 | Speller | May 5, 1959 |

FOREIGN PATENTS

| | | |
|---|---|---|
| 153,501 | Australia | Oct. 2, 1953 |
| 161,730 | Australia | Mar. 4, 1955 |

OTHER REFERENCES

Pub. I, Terman, "Radio Engineering," third ed., McGraw-Hill Book Co., New York, 1947 (pp. 595–596).